United States Patent
Kumar et al.

(10) Patent No.: US 11,869,077 B2
(45) Date of Patent: Jan. 9, 2024

(54) DEEP-LEARNING BASED SYSTEM FOR ONLINE APPLICATION ORIGINATION (OAO) FRAUD DETECTION

(71) Applicant: MASTERCARD TECHNOLOGIES CANADA ULC, Vancouver (CA)

(72) Inventors: Ashish Kumar, Lucknow (IN); Sangam Verma, Gurugram (IN); Tanmoy Bhowmik, Bangalore (IN); Karamjit Singh, Gurugram (IN); John Hearty, Vancouver (CA); Sik Suen Chan, Richmond (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 13 days.

(21) Appl. No.: 17/496,466

(22) Filed: Oct. 7, 2021

(65) Prior Publication Data

US 2023/0111621 A1   Apr. 13, 2023

(51) Int. Cl.
  *G06Q 40/00*  (2023.01)
  *G06Q 40/03*  (2023.01)
  *G06N 3/088*  (2023.01)
  *G06N 3/045*  (2023.01)

(52) U.S. Cl.
  CPC ........... *G06Q 40/03* (2023.01); *G06N 3/045* (2023.01); *G06N 3/088* (2013.01)

(58) Field of Classification Search
  CPC ......... G06Q 40/03; G06N 3/045; G06N 3/088
  USPC ................................................. 705/4, 35–45
  See application file for complete search history.

(56) References Cited

U.S. PATENT DOCUMENTS

| | | | |
|---|---|---|---|
| 10,440,180 B1* | 10/2019 | Jayapalan | G06Q 30/01 |
| 2015/0339769 A1* | 11/2015 | deOliveira | G06Q 40/03 |
| | | | 705/38 |
| 2020/0279266 A1* | 9/2020 | Hearty | G06Q 40/03 |
| 2020/0279274 A1* | 9/2020 | Hearty | G06Q 40/03 |

(Continued)

FOREIGN PATENT DOCUMENTS

CN   111260462 A   6/2020

OTHER PUBLICATIONS

Wang, H., et al. (Nov. 2018). Deep structure learning for fraud detection. In 2018 IEEE International Conference on Data Mining (ICDM) (pp. 567-576). IEEE. (Year: 2018).*

(Continued)

*Primary Examiner* — Mike Anderson
*Assistant Examiner* — Mohammed H Mustafa
(74) *Attorney, Agent, or Firm* — Michael Best & Friedrich LLP

(57) ABSTRACT

A fraud prevention server that includes an electronic processor and a memory. The memory includes an online application origination (OAO) service and a plurality of OAO models, each of the plurality of OAO models differentiates between a behavior of a normal user and a behavior of a nefarious actor during a submission of the online application on a device. When executing the OAO service, the electronic processor is configured to receive form data from a client server, determine a best OAO model from a plurality of OAO models with deep-learning, determine a fraud score of the online application based on the best OAO model, and control the client server to approve, hold, or deny the online application based on the fraud score that is determined.

20 Claims, 12 Drawing Sheets

(56) References Cited

U.S. PATENT DOCUMENTS

2020/0280578 A1\* 9/2020 Hearty .............. G06Q 20/4093
2020/0364366 A1   11/2020 Kundu et al.
2021/0097545 A1\* 4/2021 Laptiev .............. G06Q 20/401
2021/0125275 A1\* 4/2021 Adibi .................. G06Q 40/03

OTHER PUBLICATIONS

International Search Report and Written Opinion for Application No. PCT/CA2022/051471 dated Dec. 5, 2022 (9 pages).
Wang, H., et al. (Nov. 2018). Deep structure learning for fraud detection. In 2018 IEEE International Conference on Data Mining (ICDM) (pp. 567-576). IEEE.

\* cited by examiner

- Client #2 Dataset Part 1 (Half Client #2 Dataset)
- Client #2 Dataset Part 2 (Other half of Client #2 Dataset)
- Client #2 Dataset Part 2 Reversed (Other half of Client #2 Dataset with targets reversed)
- Client #1 Dataset

| Dataset | Feature Distribution Similarity P(X) | Conditional Target Distribution Similarity (Y\|X) | % gain in AP of Combined Model | Similarity Ranking |
|---|---|---|---|---|
| Client #2 Dataset Part 1 + Client #1 Dataset | ✗ | ✗ | − 0.09%  ■ | 2nd |
| Client #2 Dataset Part 1 + Client #2 Dataset Part 2 | ✓ | ✓ | + 1.82%  ← | 1st |
| Client #2 Dataset Part 1 + Client #2 Dataset Part 2 Reversed | ✓ | ✗ | − 14.81%  → | 3rd |

FIG. 12

DEEP-LEARNING BASED SYSTEM FOR ONLINE APPLICATION ORIGINATION (OAO) FRAUD DETECTION

BACKGROUND

Preventing Online Account Origination (OAO) fraud affects many industries including financial, gaming, healthcare, and electronic commerce. In particular, OAO fraud affects financial institutions when fraudulent applicants are issued credit cards and the fraudulent applicants do not to return the money from use of the issued credit cards. Bad actors may create a fraudulent application with identity theft or a synthetic identity, use automation to create fake accounts, or hire third-party actors to generate as many fraudulent applications as possible.

SUMMARY

The main challenge with respect to fraudulent applications is detecting such applications when the applications are human or human-like. Behavioral analytics (e.g., features such as familiarity with form, typing speed, keyboard shortcuts used, or other behavioral features) may be used to detect the fraudulent applications. Therefore, the remaining challenge in detecting the fraudulent application is how to use the behavioral features while filling an online form to authenticate the application.

In one example implementation, machine learning using meta learning and Bayesian learning may provide a real-time solution for fraud detection that does not bother a good-faith application and at the same time adaptive for new clients of the OAO service and new applicants.

Embodiments herein solve the OAO fraud detection problem by breaking the problem down into the following: 1) reducing the number of models per form type by half and 2) quick start for a new applicant. Traditionally M would be equal to N, i.e., one model per form type which will become redundant and difficult to handle once the number of form types becomes very large. The system of the present disclosures handles this issue by reducing the number of models per form type by half i.e., $M=N/2$.

Additionally, when a new client joins the program, the system would typically not have enough data to train a new model for the new client. The system of the present disclosure provides a quick start for the new client by selecting the best existing model based upon the available data for the new client.

One embodiment described herein is a server. The server includes an electronic processor and a memory. The memory including an online application origination (OAO) service and a plurality of online application origination (OAO) models, each of the plurality of OAO models differentiates between a behavior of a normal user and a behavior of a nefarious actor during a submission of the online application on a device. When executing the OAO service, the electronic processor is configured to receive form data from a client server, determine a best OAO model from the plurality of OAO models with deep-learning, determine a fraud score of the online application based on the best OAO model, and control the client server to approve, hold, or deny the online application based on the fraud score that is determined.

Another embodiment described herein is a method. The method includes receiving, with an electronic processor executing the OAO service, form data from a client server. The method includes determining, with the electronic processor executing the OAO service with deep-learning, a best OAO model from a plurality of OAO models, each of the plurality of OAO models differentiates between a behavior of a normal user and a behavior of a nefarious actor during a submission of the online application on a device. The method includes determining, with the electronic processor executing the OAO service, a fraud score of an online application based on the best OAO model. The method also includes controlling, with the electronic processor executing the OAO service, the client server to approve, hold, or deny the online application based on the fraud score that is determined.

Yet another embodiment described herein is a fraud prevention system. The system including a client server and a fraud prevention server. The fraud prevention server includes an electronic processor and a memory. The memory including an online application origination (OAO) service and a plurality of online application origination (OAO) models, each of the plurality of OAO models differentiates between a behavior of a normal user and a behavior of a nefarious actor during a submission of the online application on a device. When executing the OAO service, the electronic processor is configured to receive form data from the client server, determine a best OAO model from the plurality of OAO models with deep-learning, determine a fraud score of the online application based on the best OAO model, and control the client server to approve, hold, or deny the online application based on the fraud score that is determined.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Other aspects of the embodiments will become apparent by consideration of the detailed description and accompanying drawings.

BRIEF DESCRIPTION OF THE DRAWINGS

FIG. 12 is a chart illustrating a similarity comparison of different datasets with respect to a combined OAO model, according to embodiments described herein.

DETAILED DESCRIPTION

Embodiments described herein relate to an online application origination service (also referred to as "OAO service") for a fraud prevention system, and environments and systems utilizing this service. The OAO service analyzes form completion behavior, evaluating hundreds of non-identifying and zero-permission attributes against each application. These attributes capture a variety of distinctive behavioral markers that are predictive of application fraud risk.

Nefarious actors tend to display a familiarity with, e.g., form content and technological fluency that allows them to complete forms quickly, surely and by leveraging technological tricks and shortcuts. The OAO service monitors dozens of attributes related to typing speed and cadence, fluency of field navigation, shortcut use and form familiarity (expressed through such behaviors as skipping optional fields and avoiding form completion errors). The OAO service evaluates a range of directness, exploratory and detail-checking behaviors that differ significantly between good and nefarious actors. Additionally, in some examples, the OAO service may also evaluate any number of non-behavioral features along with the behavioral features to further distinguish between good and nefarious actors.

Figure 1:
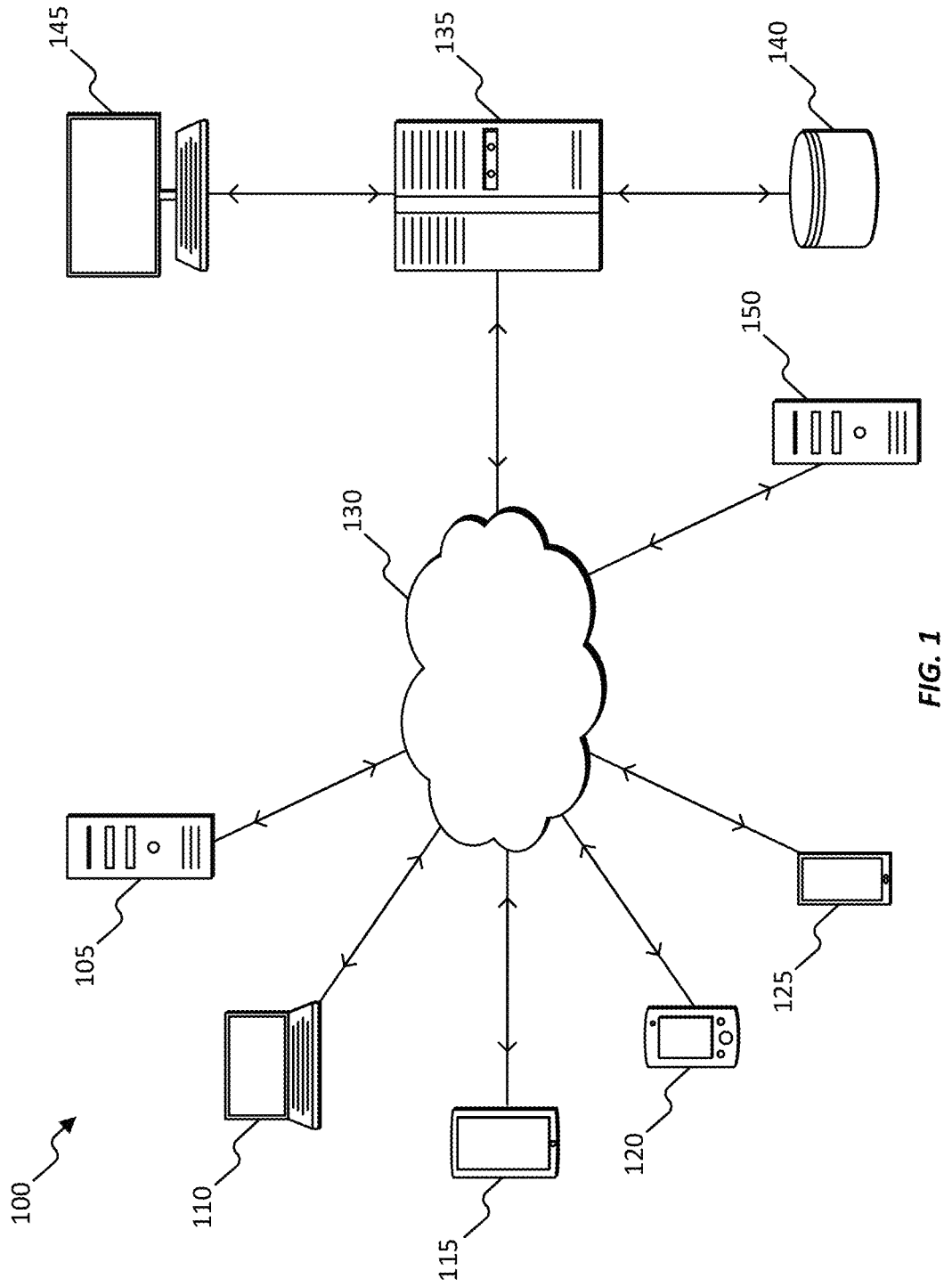
FIG. 1 is a diagram that illustrates a fraud prevention system for an OAO service that evaluates a user's behavior while opening an online account, according to embodiments described herein.

FIG. 1 illustrates a system 100 for an OAO service that evaluates a user's behavior while opening an online account. The system 100 includes a plurality of user devices 105-125, a network 130, a fraud prevention server 135, a database 140, a server-side user interface 145 (e.g., a workstation), and a client server 150. The plurality of user devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the user devices 105-125 is configured to communicatively connect to the fraud prevention server 135 through the network 130 and provide information to the fraud prevention server 135 related to attributes or values for attributes of the user devices 105-125. Attributes of the user devices 105-125 include, for example, user agent, operating system, account ID, location, time of day, mouse location, or other suitable attribute information regarding both the user device and a user of the user device. Attribute information received from the user devices 105-125 at the fraud prevention server 135 may be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the fraud prevention server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides a credit card to a user that establishes an account with the bank by performing an online application origination (e.g., filling out a form, either as part or all of what is required to establish an account). The remainder of the disclosure refers to a "credit card" as the resource that is provided by the resource provider. However, any resource that is available by an online application origination may be considered in place of the "credit card" as described herein.

Figure 2:
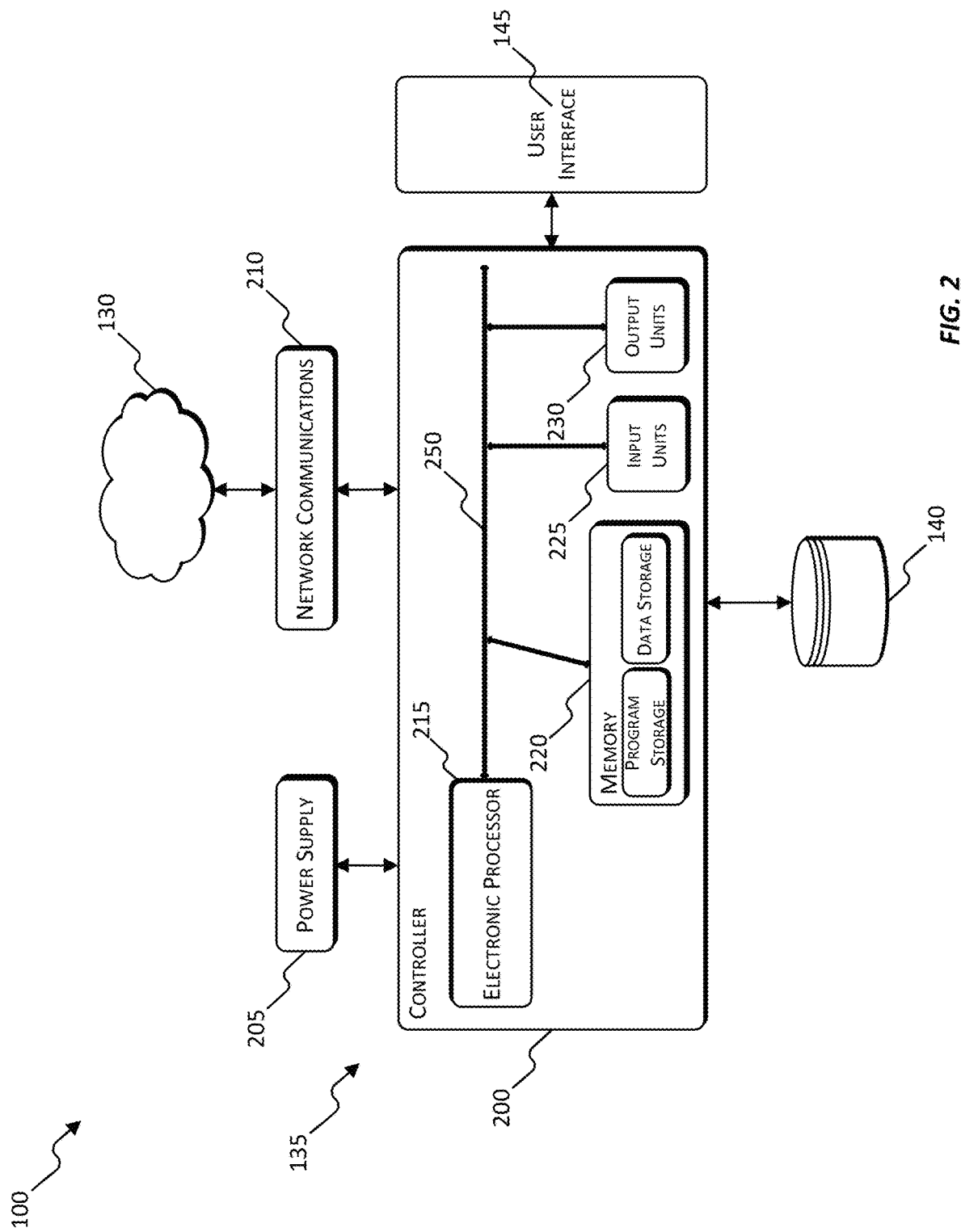
FIG. 2 is a block diagram that illustrates the server of the fraud prevention system of FIG. 1, according to embodiments described herein.

FIG. 2 is a block diagram that illustrates the fraud prevention server 135 of the system 100 of FIG. 1. The fraud prevention server 135 is electrically and/or communicatively connected to a variety of modules or components of the system 100. For example, the illustrated fraud prevention server 135 is connected to the database 140 and the user interface 145. The fraud prevention server 135 includes a controller 200, a power supply module 205, and a network communications module 210. The controller 200 includes combinations of hardware and software that are configured to, for example, provide the OAO service to evaluate the behaviors of the users associated with the devices 105-125 while the users are opening an online account. The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer-readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the OAO service program (referred to herein as "OAO service") as described in greater detail below.

The electronic processor 215 executes machine-readable instructions stored in the memory 220. For example, the electronic processor 215 may execute instructions stored in the memory 220 to perform the functionality of the OAO service. In some examples, the functionality of the OAO service includes an OAO model as well as machine learning to generating a machine learning function.

Machine learning generally refers to the ability of a computer program to learn without being explicitly programmed. In some embodiments, a computer program (for example, a learning engine) is configured to construct an algorithm (also referred to herein as a "machine learning function" or "statistical function") based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics. In some examples, the machine learning performed by the fraud prevention server 135 in executing the OAO service is an ensemble machine learning model named XGBoost (eXtreme Gradient Boosting trees), a gradient boosting algorithm implemented for speed and performance. This learning model utilizes many (for example, thousands) of independent trees whose results are aggregated or otherwise combined (e.g. via voting) to produce a final prediction value.

In some examples, one implementation of the machine learning is to extract the statistical function learned by the fraud prevention server 135 and deploy the statistical function as a lightweight endpoint (i.e., the OAO model stored in the memory 220) on the fraud prevention server 135. The fraud prevention server 135 may call the OAO model with a real data sample to obtain an immediate prediction. This is typically done using an application container, e.g., using the Docker technology.

In other examples, another implementation of the machine learning is to extract the statistical function learned by the fraud prevention server 135 and deploy the statistical function as a rule in a larger online application service on the fraud prevention server 135. This implementation executes the OAO service as a rule alongside other rules (for example, alongside the rules described), folding the OAO model (i.e., the statistical function) neatly into a larger online application service.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the OAO service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 145 includes a combination of digital and analog input or output devices required to achieve a desired level of control and monitoring of the system 100. For example, the user interface 145 includes a display (e.g., a primary display, a secondary display, etc.) and input devices such as a mouse, touch-screen displays, a plurality of knobs, dials, switches, buttons, or other suitable input device. The display is, for example, a liquid crystal display ("LCD"), a light-emitting diode ("LED") display, an organic LED ("OLED") display, or other suitable display.

The fraud prevention server 135 is configured to perform the OAO service to evaluate how fields have been completed, evaluating a broad set of attributes that enable the model to distinguish between benign autofill and scripted form completion. By looking at fields that are challenging to autofill (e.g., 3-part phone number fields), the fraud prevention server 135 is able to separate autofill from scripted automation by detecting the effectiveness of form-specific scripted solutions. Similarly, the fraud prevention server 135 separates good users and nefarious actors by differentiating their behavior, for example, by detecting common manual fraud approaches (e.g., copy-paste) and even assessing user familiarity with the data in highly memorable fields (e.g., a Full Name field and a Phone Number field).

The fraud prevention server 135 monitors the fields that are being completed either directly or indirectly. In some examples, when the client server 150 hosts the entire online application, the fraud prevention server 135 may indirectly receive information regarding these fields when the client server 150 stores the fields that have been completed in memory and transmits this information to the fraud prevention server 135. For example, the client server 150 may transmit this information to the fraud prevention server 135 in real-time or near real-time or may transmit this information to the fraud prevention server 135 upon submission of the online application to the client server 150.

Alternatively, in other examples, the fraud prevention server 135 may partially or completely host the online application. In these examples, the fraud prevention server 135 may directly store information regarding the fields that have been completed with respect to the online application in the memory 220.

The following data points are an illustrative subset of the data that may be used by the fraud prevention server 135 in performing the OAO service to detect fraudulent behavior (and consequently, application risk): 1) cadence of completing the form, 2) method of moving through the form (click or tab), 3) progression through the form, 4) field order and 'circle back' behavior, 5) cadence and speed of user typing, 6) form focus and window-switching behavior, 7) detail-checking, and pausing behavior, 7) dynamics of mouse and touch interactions, 8) device orientation and accelerometer, 9) form field autocomplete or copy-paste behavior, and 10) familiarity with the form, e.g., omission of optional fields and error incidence rate.

The OAO service executed by the fraud prevention server 135 includes an OAO model. In some embodiments, the fraud prevention server 135 receives a dataset of fraudulent applications (e.g., hundreds or thousands of example fraudulent applications) and uses the machine learning to output an OAO model that accounts for the various fraudulent aspects of the dataset as set forth in the feature set below. The fraud prevention server 135 may then use the OAO model that is generated by machine learning to perform advanced classifications and generate a "Fraud Risk" score against application attempts in real-time. The "Fraud Risk" score measures the probability that the current application attempt was performed by a nefarious actor using manual or automated identify fraud. This probability is calculated using real-world data, where the fraud prevention server 135 compares thousands of model variants using the dataset from tens of thousands of applications across various application forms.

However, the OAO service may also including a plurality of OAO models that correspond to different clients. Rather than building a new OAO model for each new client, the OAO service may use machine learning (referred to as a "decision module") to determine the best pre-existing OAO model for the new client.

Figure 3:
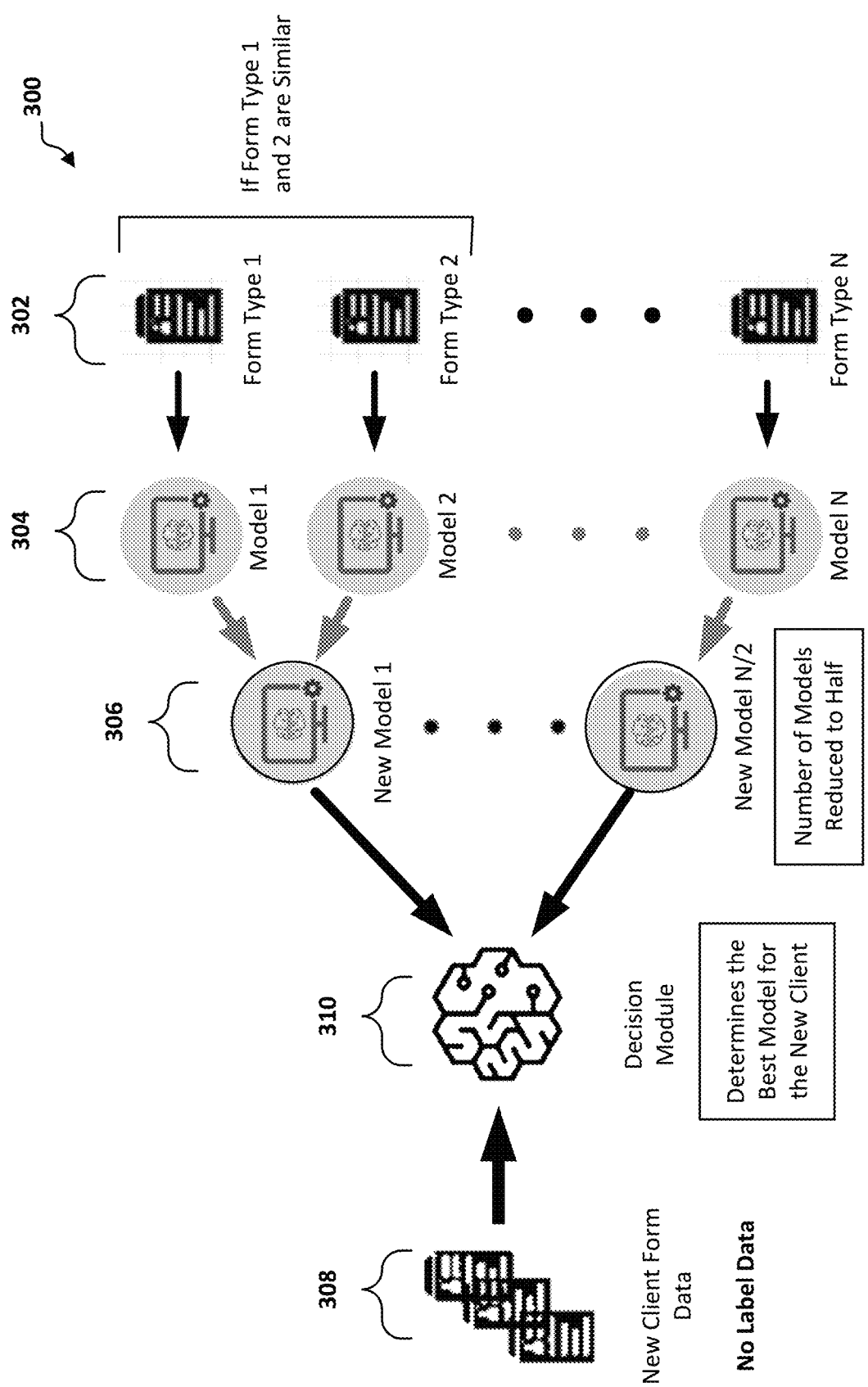
FIG. 3 is a flow diagram that illustrates deep-learning system for the OAO fraud detection, according to embodiments described herein.

FIG. 3 is a flow diagram that illustrates a deep-learning system 300 for the OAO fraud detection, according to embodiments described herein. In the example of FIG. 3, the OAO service uses machine learning to generate a first plurality of OAO models 304 from a plurality of form types 302. In some examples, each of the plurality of form types 302 is from a different client and each of the first plurality of OAO models 304 is for a different client. In other examples, each of the plurality of form types 302 is from the same client and each of the first plurality of OAO models 304 is for a different form type from the same client.

In the event that two or more of the form types from the plurality of form types 302 are similar to each other, then the OAO service may combine the respective models into a combined model that is equally applicable to both form types. As illustrated in FIG. 3, Form Type 1 and Form Type 2 are similar, the OAO service combines Model 1 generated from Form Type 1 and Model 2 generated from Form Type 2 into New Model 1 that is included in a second plurality of OAO models 306 that is less than the first plurality of OAO models 304. For example, the second plurality of OAO models 306 may be half of the first plurality of OAO models 304. By reducing the number of OAO models, the OAO service frees up additional storage space for additional models of new clients that are not similar enough to use a pre-existing OAO model.

Additionally, as illustrated in FIG. 3, the OAO service receives new client form data 308 and determines the best pre-existing OAO model from the second plurality of OAO models 306 with a decision module 310 (e.g., machine learning). By using the best pre-existing OAO model, the OAO service may significantly reduce the amount of time required to on-board a new client. In other words, the OAO service may be used with a larger number of clients and the time to on-board new clients is also reduced.

Figure 4:
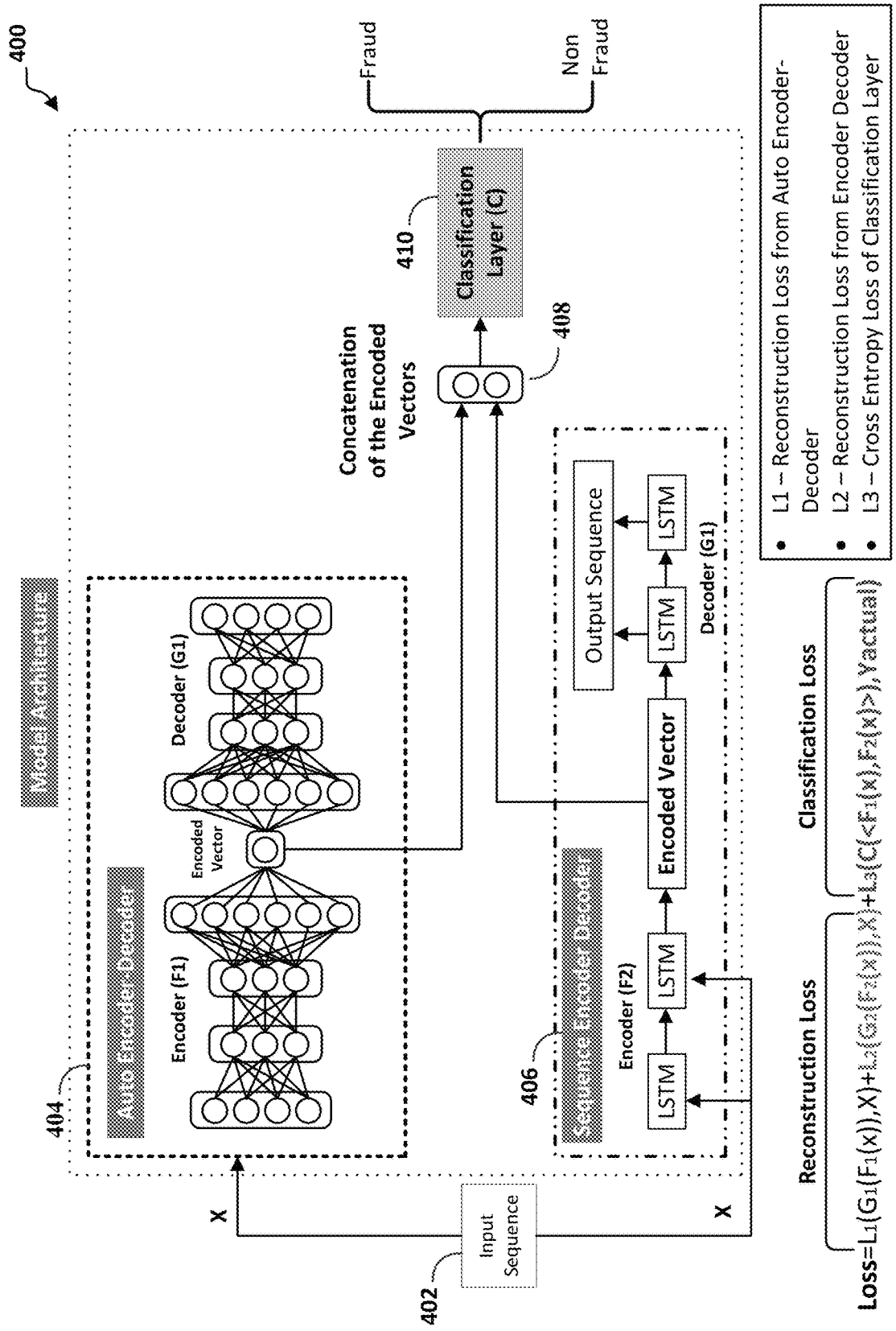
FIG. 4 is a block diagram that illustrates a model architecture of the deep-learning system for the OAO fraud detection, according to embodiments described herein.

FIG. 4 is a block diagram that illustrates a model architecture 400 of the OAO model for the OAO fraud detection, according to embodiments described herein. In the example of FIG. 4, the model architecture 400 includes an input sequence 402, an auto encoder-decoder 404, a sequence encoder-decoder 406, a concatenation of encoded vectors 408, and a classification layer 410.

The input sequence 402 may be the new client form data 308 as described and illustrated in FIG. 3. The auto encoder-decoder 404 is a neural network that uses machine learning to copy its input to its output. The auto encoder-decoder 404 has an internal layer that describes an encoded vector to represent the input. The internal layer has two main parts: 1) an encoder that maps the input into the code and 2) a decoder that maps the code to a reconstruction of the input.

The sequence encoder-decoder 406 like the auto encoder-decoder 404 includes an encoder and decoder. However, the encoder of the sequence encoder-decoder 406 processes each token in an input sequence by inserting all of the information about the input sequence into a vector of fixed length, i.e., the encoded vector. In the example of FIG. 4, the encoder includes two long short-term memory (LSTM) blocks, which are each an artificial recurrent neural network (RNN) architecture that perform deep learning on the same input sequence while the second LSTM block receives the encoded vector of the first LSTM block. The decoder reads the encoded vector and tries to predict the output sequence token by token.

The concatenation of encoded vectors 408 is a concatenation of the encoded vector from the auto encoder decoder 404 with the encoded vector from the sequence encoder-decoder 406. For example, the concatenation of encoded vectors 408 may be one end of the encoded vector from the auto encoder decoder 404 with another end of with the encoded vector from the sequence encoder-decoder 406. The classification layer 410 classifies the concatenation of encoded vectors 408 as either "FRAUD" or "NON-FRAUD." In some examples, the classification by the classification layer 410 may a fraud risk score that indicates "FRAUD" or "NON-FRAUD."

Additionally, the model architecture 400 also has a loss that occurs in the auto encoder-decoder 404 and the sequence encoder-decoder 406. The loss is represented in the following expression:

$$\text{Loss} = L1(G1(F1(x)),x) + L2(G2(F2(x)),x) + L3(C(<F1(x),F2(x)>), Y_{actual}) \quad (1)$$

In Expression (1), L1 is the reconstruction loss from the auto encoder-decoder 404, L2 is the reconstruction loss from the sequence encoder-decoder 406, and L3 is the cross entropy loss of the classification layer 410. Further, in the Expression (1), G1 is the loss of the decoder of the auto encoder-decoder 404, F1 is the loss of the encoder of the auto encoder-decoder 404, F2 the loss of the encoder of the sequence encoder-decoder 406, and G2 is the loss of the decoder of the sequence encoder-decoder 406.

Figure 5:
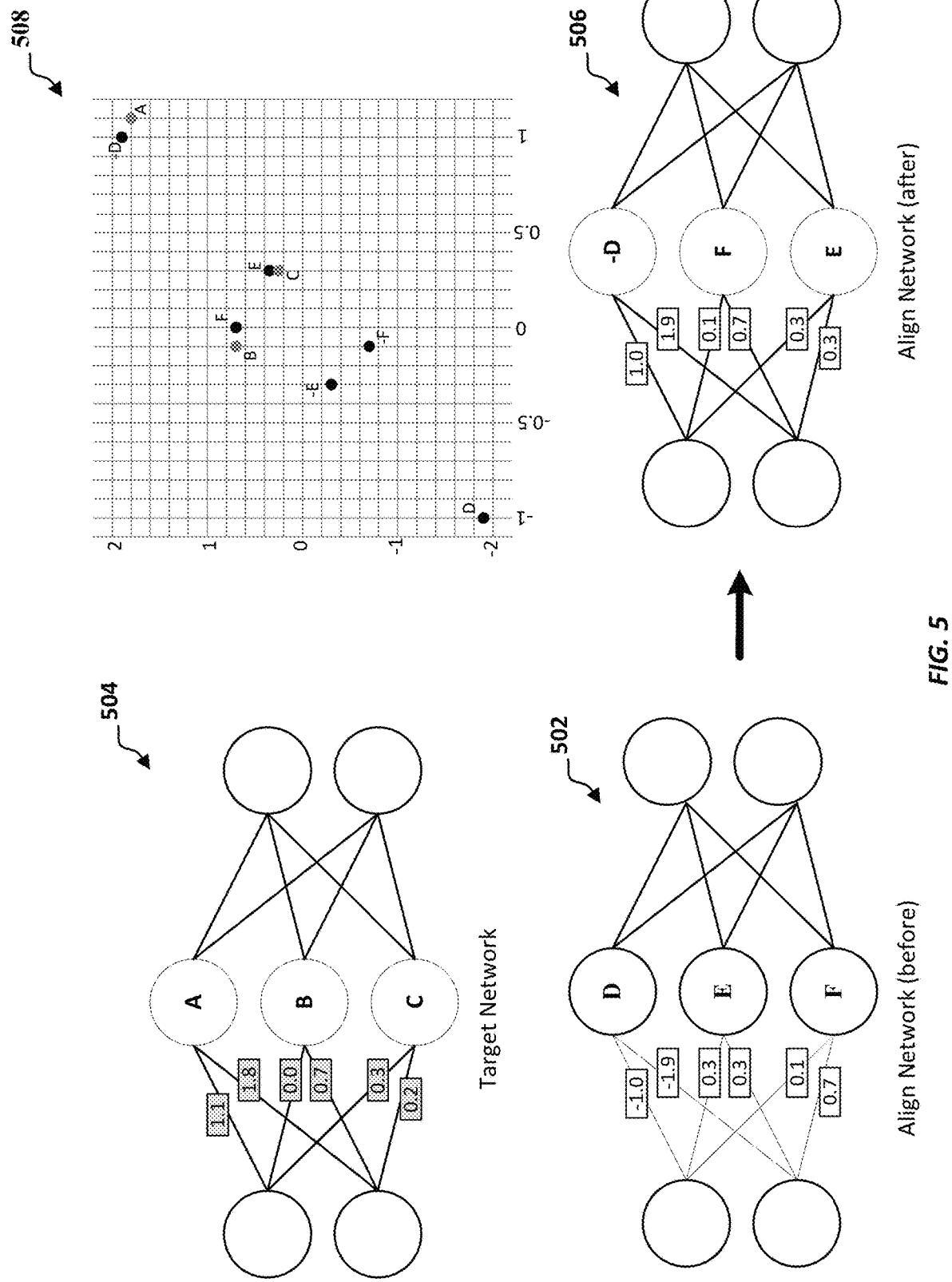
FIG. 5 is a diagram that illustrates an alignment of a network with a target network, according to embodiments described herein.

FIG. 5 is a diagram that illustrates an alignment of a network 502 with a target network 504, according to embodiments described herein. In the example of FIG. 5, the network 502 includes nodes "D," "E," and "F". The distance between a first input node 510 and nodes "D," "E," and "F" is −1.0, 0.3, and 0.1, respectively. The distance between a second input node 512 and nodes "D," "E," and "F" is −1.9, 0.3, and 0.7, respectively.

The target network 504 includes nodes "A," "B," and "C". The distance between a first input node 514 and nodes "A," "B," and "C" is 1.1, 0.0, and 0.3, respectively. The distance between a second input node 516 and nodes "A," "B," and "C" is 1.8, 0.7, and 0.2, respectively.

The aligned network 506 includes nodes "-D," "F," and "E". The distance between a first input node 518 and nodes "-D," "F," and "E" is 1.1, 0.1, and 0.3, respectively. The distance between a second input node 520 and nodes "-D," "F," and "E" is 1.9, 0.7, and 0.3, respectively.

As illustrated in the chart 508 of FIG. 5, the node "-D" of the aligned network 506 corresponds similarly to the node "A" of the target network 504. Likewise, the nodes "F" and "E" of the aligned network 506 corresponds similarly to the node "B" and "C" of the target network 504, respectively. Moreover, when the states of the nodes "-D," "F," and "E" are applied to the distances 1.0, 1.9, 0.1, 0.7, 0.3, and 0.3, respectively, then the nodes "-D," "F," and "E" will revert approximately back to positions of the nodes "D," "E," and "F" in the network 502.

Figure 6:
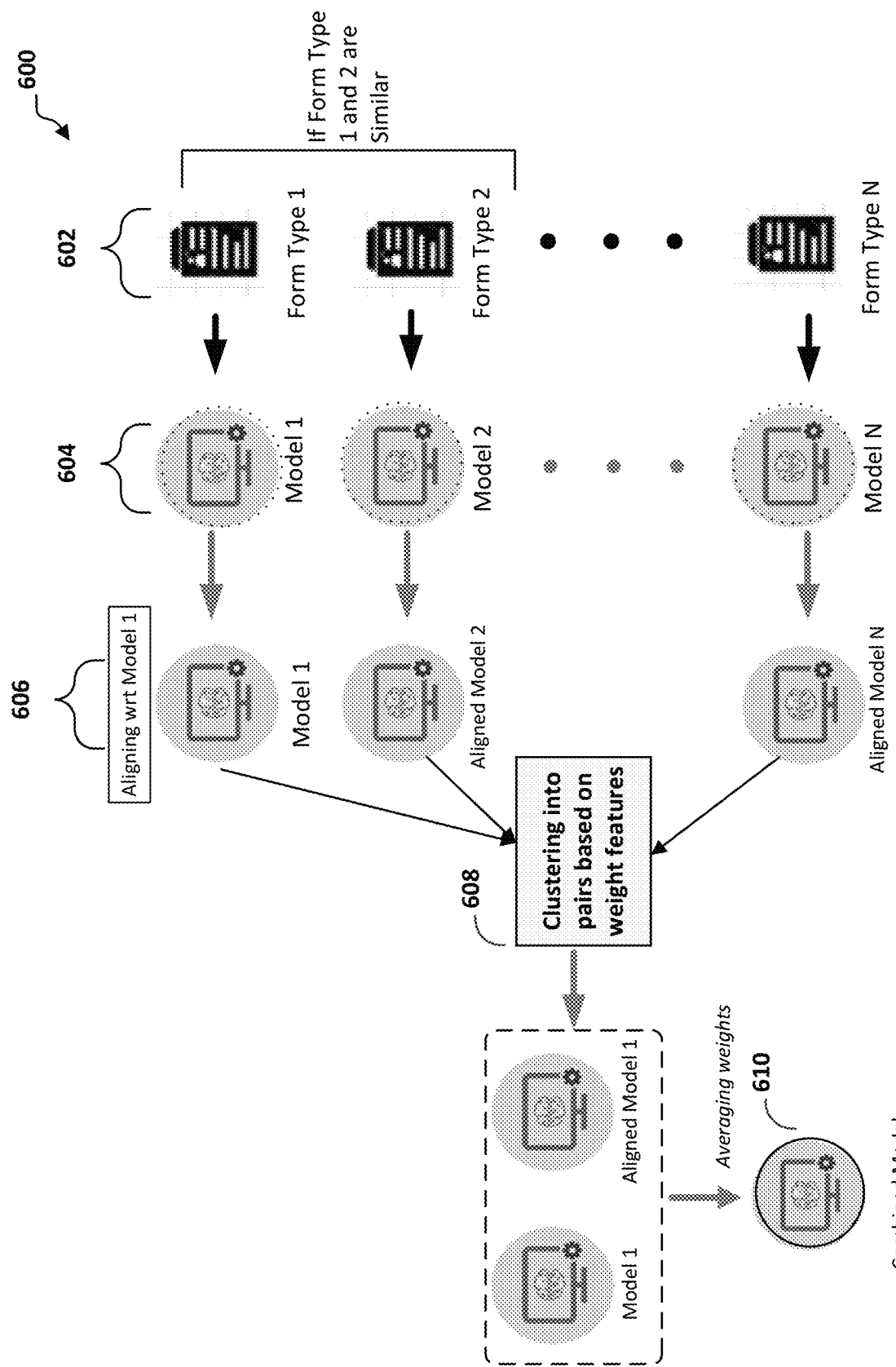
FIG. 6 is a flow diagram that illustrates an alignment of model pairs that are combined into a combined model, according to embodiments described herein.

FIG. 6 is a flow diagram that illustrates an alignment of model pairs that are combined into a combined model, according to embodiments described herein. In the example of FIG. 6, the OAO service uses machine learning to generate a first plurality of OAO models 604 from a plurality of form types 602. In some examples, each of the plurality of form types 602 is from a different client and each of the first plurality of OAO models 604 is for a different client. In other examples, each of the plurality of form types 602 is from the same client and each of the first plurality of OAO models 604 is for a different form type from the same client.

In the event that two or more of the form types from the plurality of form types 602 are similar to each other, then the OAO service may combine the respective models into a combined model that is equally applicable to both form types. As illustrated in FIG. 6, Form Type 1 and Form Type 2 are similar, the OAO service aligns Model 1 generated from Form Type 1 and Model 2 generated from Form Type 2 into Aligned Model 1 that is included in a second plurality of OAO models 606 that is less than the first plurality of OAO models 604. For example, the Aligned Model 1 may be a model of the aligned network 506 as described with respect to FIG. 5.

Additionally, as illustrated in FIG. 6, the OAO service clusters the second plurality of OAO models 606 into pairs 608 based on weight features in the second plurality of OAO models 606. For example, the OAO service may cluster the Model 1 and the Aligned Model 1 based on a similarity between their respective weights and then average the weights of the Model 1 and the Aligned Model 1 to generate a combined model 610.

Figure 7:
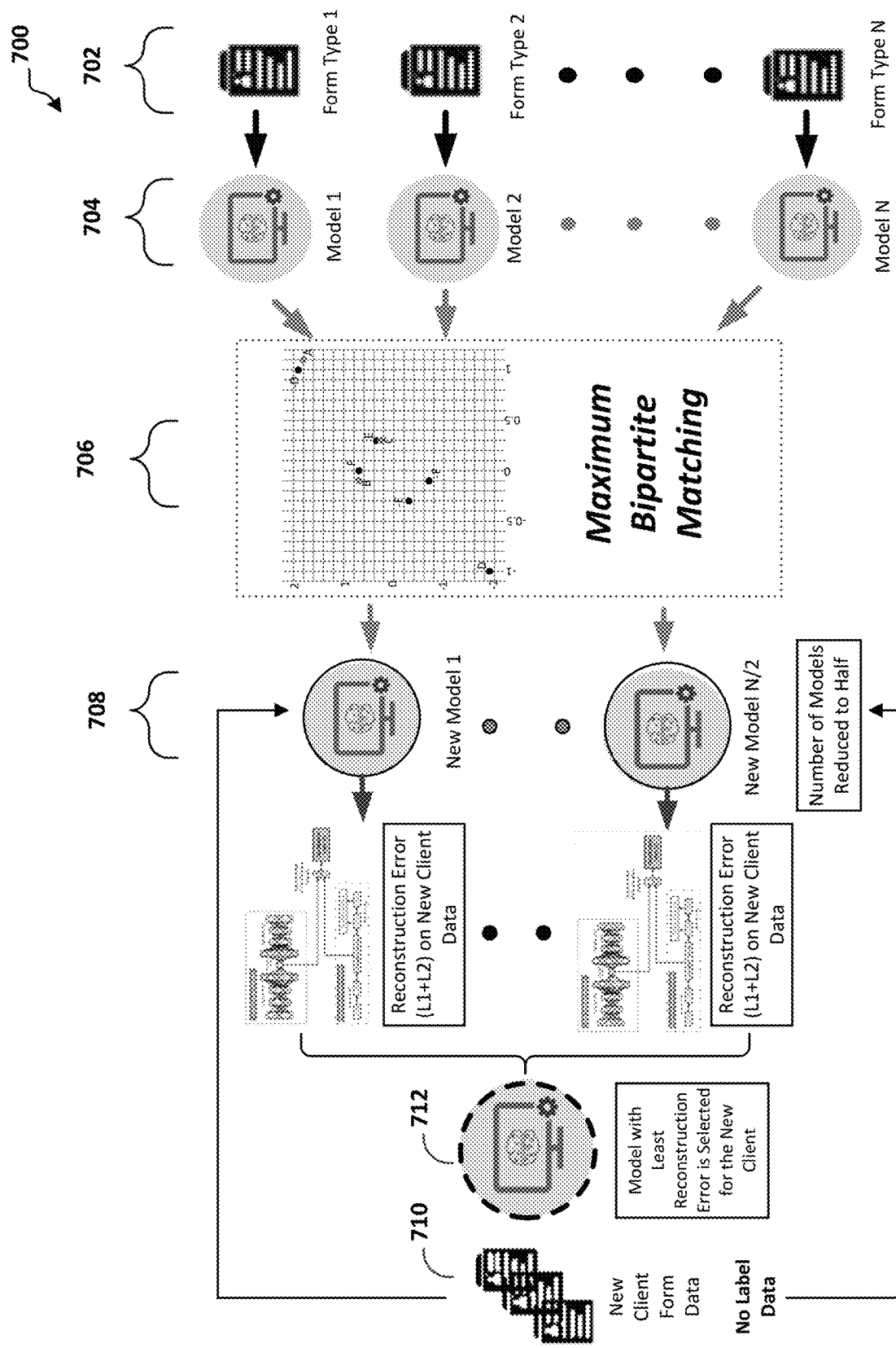
FIG. 7 is a flow diagram that illustrates model matching and selection for a new client, according to embodiments described herein.

FIG. 7 is a flow diagram that illustrates model matching and selection for a new client, according to embodiments described herein. In the example of FIG. 7, the OAO service uses machine learning to generate a first plurality of OAO models 704 from a plurality of form types 702. In some examples, each of the plurality of form types 702 is from a different client and each of the first plurality of OAO models 704 is for a different client. In other examples, each of the plurality of form types 702 is from the same client and each of the first plurality of OAO models 704 is for a different form type from the same client.

In the event that two or more of the form types from the plurality of form types 702 are similar to each other, then the OAO service may combine the respective models into a combined model that is equally applicable to both form types. As illustrated in FIG. 7, the OAO service performs maximum bipartite matching 706 on the first plurality of OAO models 704 to generate a second plurality of OAO models 708 that is less than the first plurality of OAO models 704. For example, the second plurality of OAO models 708 may be half of the first plurality of OAO models 704.

Additionally, as illustrated in FIG. 7, the OAO service receives new client form data 710 and determines the best pre-existing OAO model from the second plurality of OAO models 708 with a decision module 712 (e.g., machine learning). In the example of FIG. 7, the OAO service applies each of the second plurality of OAO models 708 to the new client form data 710 to determine a plurality of reconstruction errors. The OAO service selects an OAO model from the second plurality of OAO models 708 that has the lowest reconstruction error as the best pre-existing OAO model. By using the best pre-existing OAO model, the OAO service may significantly reduce the amount of time required to on-board a new client. In other words, the OAO service may be used with a larger number of clients and the time to on-board new clients is also reduced.

Figure 8:
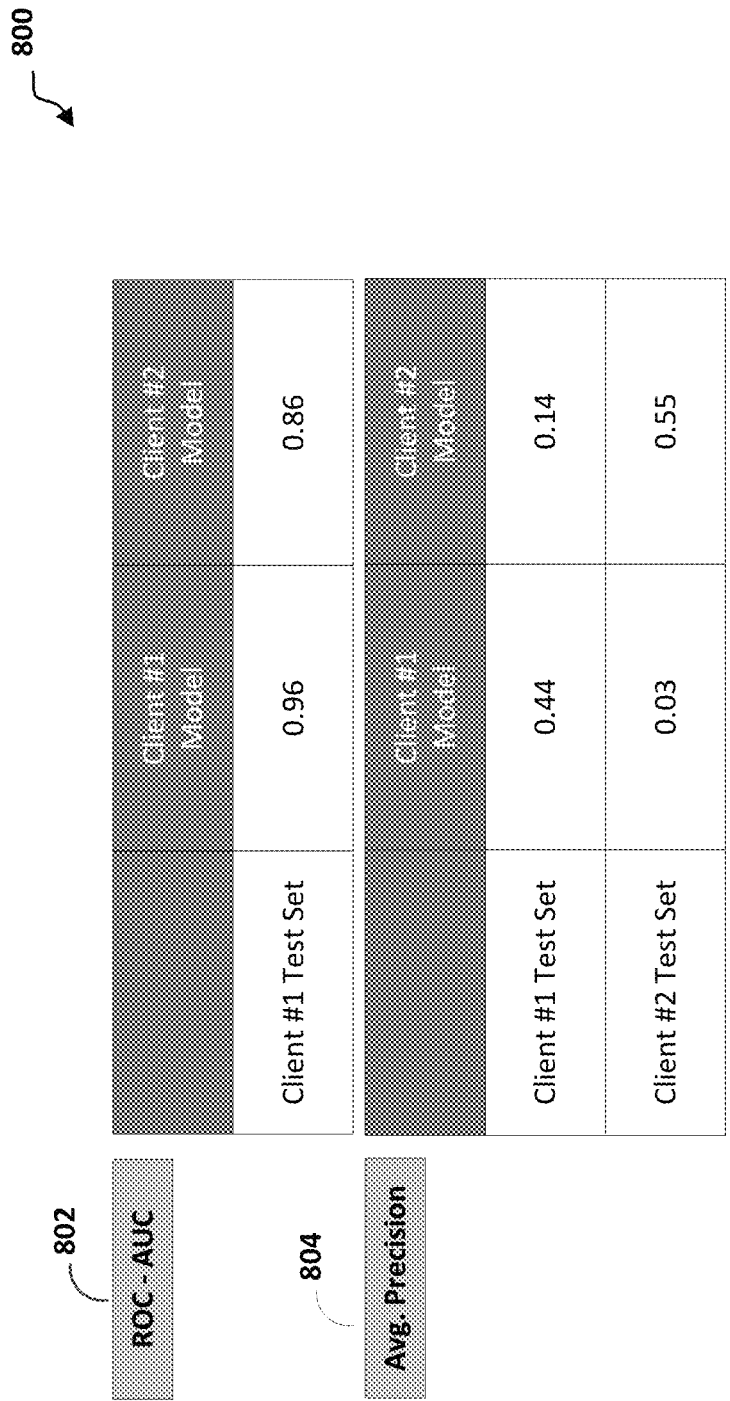
FIG. 8 is a graph that illustrates an ROC-AUC metric and an Average Precision metric between Client #1 model and Client #2 model on Client #1 data and Client #2 data, according to embodiments described herein.

FIG. 8 is a graph that illustrates an ROC-AUC metric 802 and an Average Precision metric 804 between Client #1 model and Client #2 model on Client #1 data and Client #2 data, according to embodiments described herein. In the example of FIG. 8, the ROC-AUC (Receiver Operating Characteristics-Area Under Curve) metric 802 is 0.96 when applying Client #1 Model to Client #1 test set and 0.86 when applying Client #2 Model to Client #1 test set.

Additionally, in the example of FIG. 8, the Average Precision metric 804 is 0.44 when applying Client #1 model to Client #1 test set and 0.14 when applying Client #2 model to Client #1 test set. Similarly, the Average Precision metric 804 is 0.03 when applying Client #2 model to Client #1 test set and 0.55 when applying Client #2 model to Client #2 test set.

Figure 9:
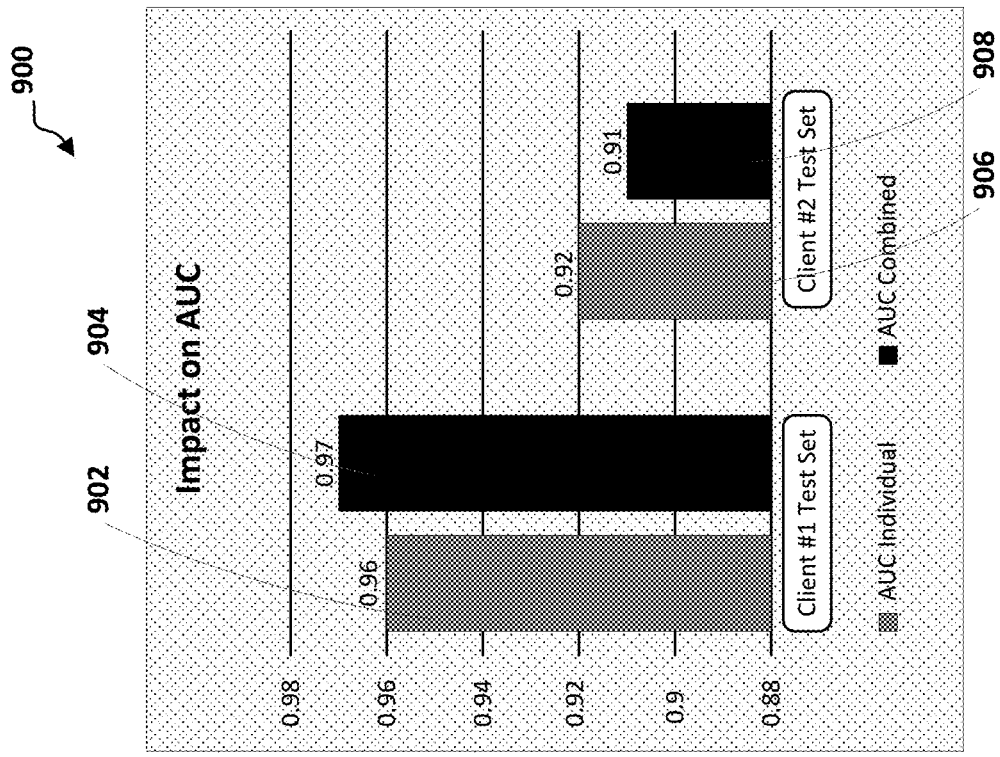
FIG. 9 is a chart illustrating the impact on area-under-the-curve (AUC) between an individual OAO model and a combined OAO model.

FIG. 9 is a chart illustrating the impact 900 on area-under-the-curve (AUC) between an individual OAO model and a combined OAO model, according to embodiments described herein. With respect to Client #1 test set, the individual OAO model has an AUC metric 902 of 0.96 and the combined OAO model has an AUC metric 904 of 0.97. Additionally, with respect to Client #2 test set, the individual OAO model has an AUC metric 906 of 0.92 and the combined OAO model has an AUC metric 908 of 0.91. In view of FIG. 9, the combined OAO model has relatively the same performance as the individual OAO model.

Figure 10:
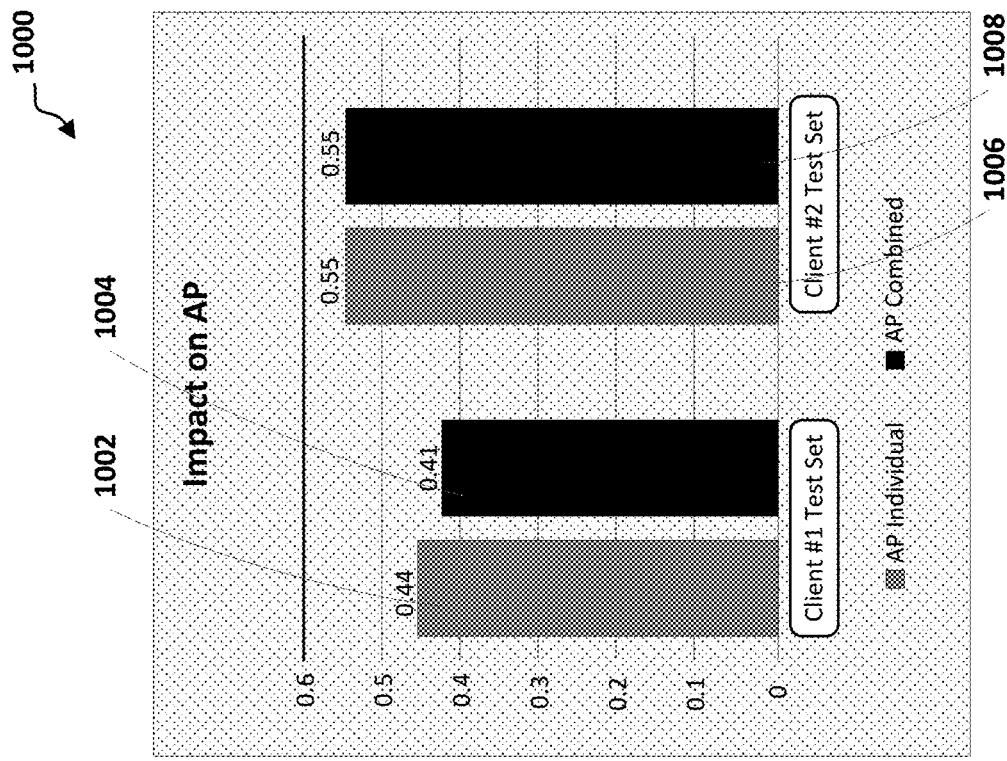
FIG. 10 is a chart illustrating the impact on average precision (AP) between an individual OAO model and a combined OAO model.

FIG. 10 is a chart illustrating the impact 1000 on average precision (AP) between an individual OAO model and a combined OAO model, according to embodiments described herein. With respect to Client #1 test set, the individual OAO model has an AP metric 1002 of 0.44 and the combined OAO model has an AP metric 1004 of 0.41. Additionally, with respect to the Client #2 test set, the individual OAO model has an AP metric 1006 of 0.55 and the combined OAO model has an AP metric 1008 of 0.55. In view of FIG. 10, the combined OAO model has relatively the same performance as the individual OAO model.

Figure 11:
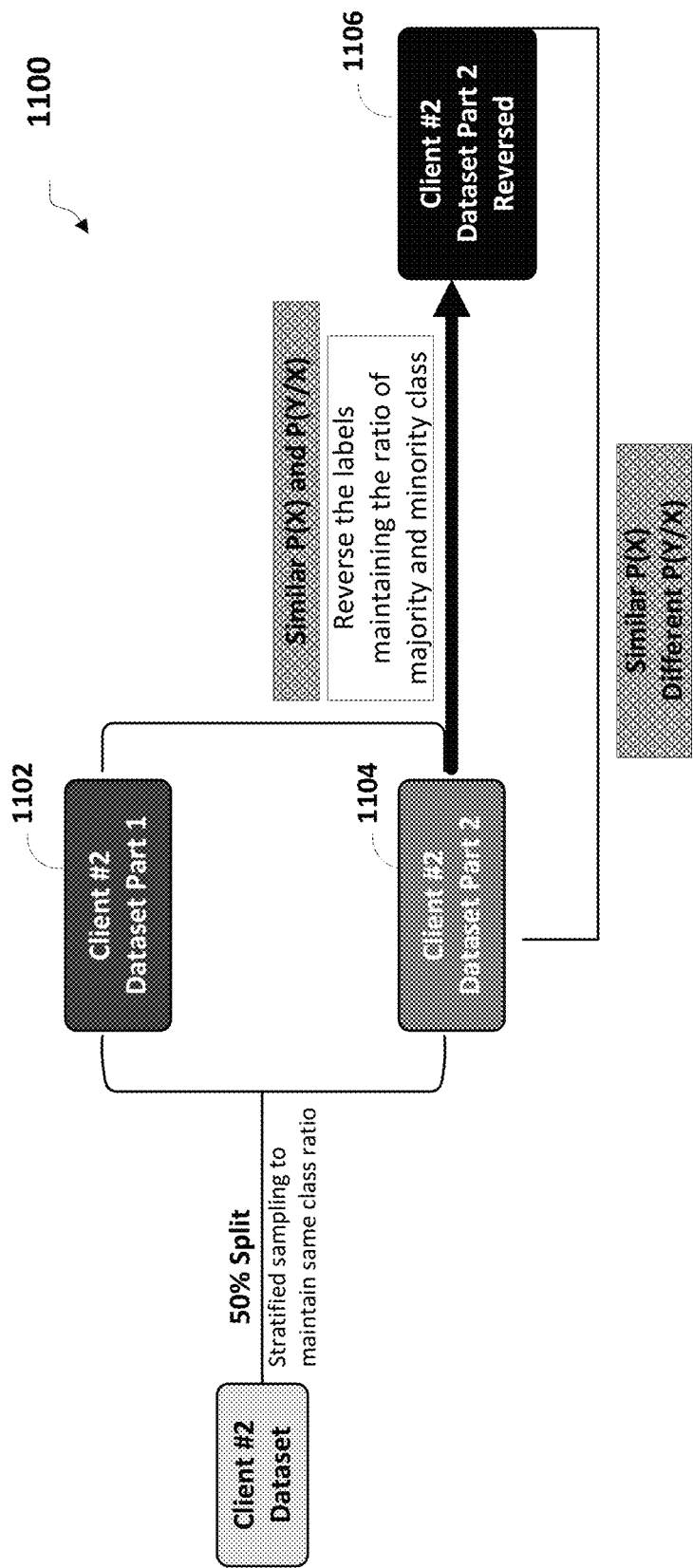
FIG. 11 is flow diagram illustrating a creation of synthetic data from Client #2, according to embodiments described herein.

FIG. 11 is flow diagram illustrating a creation 1100 of synthetic data from Client #2, according to embodiments described herein. In the example of FIG. 11, a dataset 1102 from the Client #2 is split in half to create a first portion 1104 of the Client #2 dataset and a second portion 1104 of the Client #2 dataset. A third portion 1106 of the Client #2 dataset is created by reversing the labels maintaining the ratio between the majority class and minority class in the second portion 1104.

FIG. 12 is a chart illustrating a similarity comparison 1200 of different datasets with respect to a combined OAO model, according to embodiments described herein. FIG. 12 is described at least in part with respect to FIG. 11.

In the example of FIG. 12, the similarity comparison 1200 includes a first dataset 1202, a second dataset 1204, and a third dataset 1206. The first dataset 1202 includes the first portion 1102 of the dataset from Client #2 and a dataset from the Client #1. The second dataset 1204 includes the first portion 1102 of the dataset from Client #2 and a dataset from the Client #1. The third dataset 1206 includes the first portion 1102 of the dataset from Client #2 and the third portion 1106 of the dataset from Client #2.

As illustrated in a column 1208 of the similarity comparison 1200, the first dataset 1202 has a decrease in the average precision of the combined OAO model by 0.09%, the second dataset 1204 has an uplift in the average precision of the combined OAO model by 1.82%, and the third dataset 1206 has a decrease in the average precision of the combined OAO model by 14.81%. Additionally, as illustrated in a second column 1210 of the similarity comparison 1200, the similarity ranking 1208 shows the second dataset 1204 having the highest similarity ranking based on the second dataset 1204 having the highest average precision, the first dataset 1202 having the second highest similarity ranking based on the first dataset 1202 having the second highest average precision, and the third dataset 1206 having the third highest similarity ranking based on the third dataset 1206 having the third highest average precision. The similarity ranking 1208 confirms that the combined OAO model distinguishes between the most similar datasets and the least similar datasets.

Figure 13:
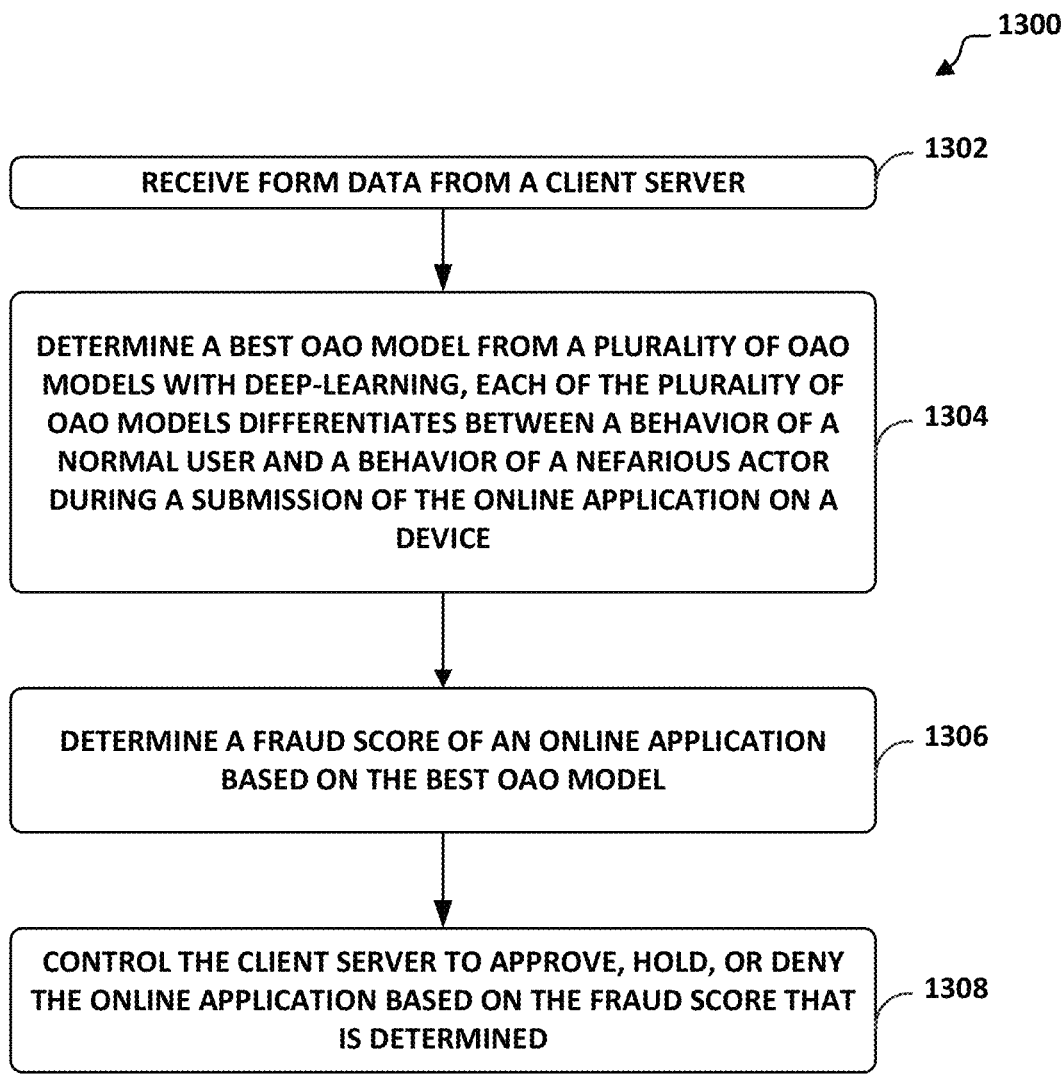
FIG. 13 is a flowchart that illustrates a method for performing a feature drift hardened OAO service to evaluate a user's behavior while opening an online account, according to embodiments described herein.

FIG. 13 is a flowchart that illustrates a method 1300 for operating a fraud prevention server, according to embodiments described herein. The method 1300 is described with respect to the fraud prevention server 135 and the client server 135 of FIG. 1.

The method 1300 includes receiving, with an electronic processor executing the OAO service, form data from a client server (at block 1302). For example, the fraud prevention server 135 receive form data from the client server 150.

The method 1300 includes determining, with the electronic processor executing the OAO service, a best OAO model from a plurality of OAO models with deep-learning, each of the plurality of OAO models differentiates between a behavior of a normal user and a behavior of a nefarious actor during a submission of the online application on a device (at block 1304). For example, when executing the OAO service, an electronic processor of the client server 135 determines a best OAO model from a plurality of OAO models, each of the plurality of OAO models differentiates between a behavior of a normal user and a behavior of a nefarious actor during a submission of the online application on one of the devices 105-125.

The method 1300 determining, with the electronic processor executing the OAO service, a fraud score of an online application based on the best OAO model (at block 1306). For example, when executing the OAO service, the electronic processor of the client server 135 determines a fraud score of the online application based on the best OAO model.

The method 1300 controlling, with the electronic processor executing the OAO service, the client server to approve, hold, or deny the online application based on the fraud score that is determined (at block 1308). For example, when executing the OAO service, the electronic processor of the client server 135 controls the client server 150 to approve, hold, or deny the online application based on the fraud score that is determined.

In some examples, determining the best OAO model from the plurality of OAO models may further include determining a reconstruction loss associated with each of the plurality of OAO models relative to the form data, and selecting an OAO model from the plurality of OAO models that has the lowest reconstruction loss as the best OAO model.

In some examples, determining the best OAO model from the plurality of OAO models may further include determining whether the reconstruction loss associated with the each of the plurality of OAO models relative to the form data exceeds a predetermined reconstruction loss threshold, generating a new OAO model based on the form data, and selecting the new OAO model as the best OAO model.

In some examples, the method 1300 may further include generating a first plurality of OAO models from a plurality of form types, and combining the first plurality of OAO models into a second plurality of OAO models that is different from the first plurality of OAO models, wherein the second plurality of OAO models is the plurality of OAO models.

In some examples, combining the first plurality of OAO models into the second plurality of OAO models further includes aligning a first portion of the first plurality of OAO models with one OAO model of the first plurality of OAO models, the one OAO model excluded from the first portion, clustering the first portion and the one OAO model into pairs based on weight features, and combining the pairs into respective combined models by averaging the weights. The respective combined models is the second plurality of OAO models.

In some examples, combining the first plurality of OAO models into the second plurality of OAO models further includes performing maximum bipartite matching to combine the first plurality of OAO models into the second plurality of OAO models.

In some examples, the second plurality of OAO models is less than the first plurality of OAO models. Additionally, in some examples, the second plurality of OAO models is half of the first plurality of OAO models.

The following are enumerated examples of servers, methods, and systems implementing the deep-learning based system for online application origination (OAO) fraud detection. Example 1: a server comprising: an electronic processor; and a memory, the memory including an online application origination (OAO) service and a plurality of OAO models, each of the plurality of OAO models differentiates between a behavior of a normal user and a behavior of a nefarious actor during a submission of the online application on a device, wherein, when executing the OAO service, the electronic processor is configured to receive form data from a client server, determine a best OAO model from the plurality of OAO models with deep-learning, determine a fraud score of the online application based on the best OAO model, and control the client server to approve, hold, or deny the online application based on the fraud score that is determined.

Example 2: the server of example 1, wherein, to determine the best OAO model from the plurality of OAO models, the electronic processor is configured to determine a reconstruction loss associated with each of the plurality of OAO models relative to the form data, and select an OAO model from the plurality of OAO models that has the lowest reconstruction loss as the best OAO model.

Example 3: the server of example 2, wherein, to determine the best OAO model from the plurality of OAO models, the electronic processor is further configured to determine whether the reconstruction loss associated with the each of the plurality of OAO models relative to the form data exceeds a predetermined reconstruction loss threshold, generate a new OAO model based on the form data, and select the new OAO model as the best OAO model.

Example 4: the server of any of examples 1-3, wherein the electronic processor is further configured to generate a first plurality of OAO models from a plurality of form types, and combine the first plurality of OAO models into a second plurality of OAO models that is different from the first plurality of OAO models, wherein the second plurality of OAO models is the plurality of OAO models.

Example 5: the server of example 4, wherein, to combine the first plurality of OAO models into the second plurality of OAO models, the electronic processor is further configured to align a first portion of the first plurality of OAO models with one OAO model of the first plurality of OAO models, the one OAO model excluded from the first portion, clustering the first portion and the one OAO model into pairs based on weight features, and combining the pairs into respective combined models by averaging the weights, wherein the respective combined models is the second plurality of OAO models.

Example 6: the server of example 4, wherein, to combine the first plurality of OAO models into the second plurality of OAO models, the electronic processor is further configured to perform maximum bipartite matching to combine the first plurality of OAO models into the second plurality of OAO models.

Example 7: the server of example 4, wherein the second plurality of OAO models is less than the first plurality of OAO models.

Example 8: the server of example 7, wherein the second plurality of OAO models is half of the first plurality of OAO models.

Example 9: a method comprising: receiving, with an electronic processor executing an online application origination (OAO) service, form data from a client server; determining, with the electronic processor executing the OAO service, a best OAO model from a plurality of OAO models with deep-learning, each of the plurality of OAO models differentiates between a behavior of a normal user and a behavior of a nefarious actor during a submission of the online application on a device; determining, with the electronic processor executing the OAO service, a fraud score of an online application based on the best OAO model; and controlling, with the electronic processor executing the OAO service, the client server to approve, hold, or deny the online application based on the fraud score that is determined.

Example 10: the method of example 9, wherein determining the best OAO model from the plurality of OAO models further includes determining a reconstruction loss associated with each of the plurality of OAO models relative to the form data, and selecting an OAO model from the plurality of OAO models that has the lowest reconstruction loss as the best OAO model.

Example 11: the method of example 10, wherein determining the best OAO model from the plurality of OAO models further includes determining whether the reconstruction loss associated with the each of the plurality of OAO models relative to the form data exceeds a predetermined reconstruction loss threshold, generating a new OAO model based on the form data, and selecting the new OAO model as the best OAO model.

Example 12: the method of any of examples 9-11, further comprising: generating a first plurality of OAO models from a plurality of form types, and combining the first plurality of OAO models into a second plurality of OAO models that is different from the first plurality of OAO models, wherein the second plurality of OAO models is the plurality of OAO models.

Example 13: the method of example 12, wherein combining the first plurality of OAO models into the second plurality of OAO models further includes aligning a first portion of the first plurality of OAO models with one OAO model of the first plurality of OAO models, the one OAO model excluded from the first portion, clustering the first portion and the one OAO model into pairs based on weight features, and combining the pairs into respective combined models by averaging the weights, wherein the respective combined models is the second plurality of OAO models.

Example 14: the method of example 12, wherein combining the first plurality of OAO models into the second plurality of OAO models further includes performing maximum bipartite matching to combine the first plurality of OAO models into the second plurality of OAO models.

Example 15: the method of example 12, wherein the second plurality of OAO models is less than the first plurality of OAO models.

Example 16: the method of example 15, wherein the second plurality of OAO models is half of the first plurality of OAO models.

Example 17: a fraud prevention system comprising: a client server; and a fraud prevention server including an electronic processor and a memory, the memory including an online application origination (OAO) service and a plurality of OAO models, each of the plurality of OAO models differentiates between a behavior of a normal user and a behavior of a nefarious actor during a submission of the online application on a device, wherein, when executing the OAO service, the electronic processor is configured to receive form data from the client server, determine a best OAO model from the plurality of OAO models with deep-learning, determine a fraud score of the online application based on the best OAO model, and control the client server to approve, hold, or deny the online application based on the fraud score that is determined.

Example 18: the fraud prevention system of example 17, wherein, to determine the best OAO model from the plurality of OAO models, the electronic processor is configured to determine a reconstruction loss associated with each of the plurality of OAO models relative to the form data, and select an OAO model from the plurality of OAO models that has the lowest reconstruction loss as the best OAO model.

Example 19: the fraud prevention system of example 18, wherein, to determine the best OAO model from the plurality of OAO models, the electronic processor is further configured to determine whether the reconstruction loss associated with the each of the plurality of OAO models relative to the form data exceeds a predetermined reconstruction loss threshold, generate a new OAO model based on the form data, and select the new OAO model as the best OAO model.

Example 20: the fraud prevention system of example 19, wherein the electronic processor is further configured to generate a first plurality of OAO models from a plurality of form types, and combine the first plurality of OAO models into a second plurality of OAO models that is different from the first plurality of OAO models, wherein the second plurality of OAO models is the plurality of OAO models.

Thus, embodiments described herein provide, among other things, a deep-learning based system for online application origination (OAO) fraud detection. Various features and advantages are set forth in the following claims.

What is claimed is:

1. A server comprising:
   an electronic processor; and
   a memory, the memory including an online application origination (OAO) service and a plurality of OAO models, each of the plurality of OAO models differentiates between a behavior of a normal user and a behavior of a nefarious actor during a submission process of an online application using a first electronic device,
   wherein, when executing the OAO service, the electronic processor is configured to
      receive form data from a third-party client server hosting a second online application that is separate and distinct from the online application,
      determine, with deep learning, a best OAO model from the plurality of OAO models with respect to the form data,
      receive information regarding a submission of the second online application using a second electronic device,
      determine a fraud score of the submission of the second online application based on the best OAO model that is determined, and
      control the third-party client server to approve, hold, or deny the submission of the second online application based on the fraud score that is determined,
   wherein the plurality of OAO models are pre-existing models that are generated from second form data relative to respective online applications, the second form data being distinct from the form data,
   wherein the best OAO model is a model from the plurality of OAO models that has the lowest error in differentiating between the behavior of the normal user and the behavior of the nefarious actor during the submission of the second online application on the second electronic device relative to other models in the plurality of OAO models,
   wherein the third-party client server is administratively controlled by a first entity, and
   wherein the server is administratively controlled by a second entity that is separate and distinct from the first entity.

2. The server of claim 1, wherein, to determine the best OAO model from the plurality of OAO models, the electronic processor is configured to
   determine a reconstruction loss associated with each of the plurality of OAO models relative to the form data, and
   select an OAO model from the plurality of OAO models that has the lowest reconstruction loss as the best OAO model, the lowest reconstruction loss associated with the lowest error in differentiating between the behavior of the normal user and the behavior of the nefarious actor during the submission of the second online application on the second electronic device.

3. The server of claim 2, wherein, to determine the best OAO model from the plurality of OAO models, the electronic processor is further configured to
   determine whether the reconstruction loss associated with the each of the plurality of OAO models relative to the form data exceeds a predetermined reconstruction loss threshold,
   generate a new OAO model based on the form data, and
   select the new OAO model as the best OAO model.

4. The server of claim 1, wherein the electronic processor is further configured to
   generate a first plurality of OAO models from a plurality of form types, and
   combine the first plurality of OAO models into a second plurality of OAO models that is different from the first plurality of OAO models, wherein the second plurality of OAO models is the plurality of OAO models.

5. The server of claim 4, wherein, to combine the first plurality of OAO models into the second plurality of OAO models, the electronic processor is further configured to
   align a first portion of the first plurality of OAO models with one OAO model of the first plurality of OAO models, the one OAO model excluded from the first portion,
   clustering the first portion and the one OAO model into pairs based on weight features, and
   combining the pairs into respective combined models by averaging the weights,
   wherein the respective combined models is the second plurality of OAO models.

6. The server of claim 4, wherein, to combine the first plurality of OAO models into the second plurality of OAO models, the electronic processor is further configured to perform maximum bipartite matching to combine the first plurality of OAO models into the second plurality of OAO models.

7. The server of claim 4, wherein the second plurality of OAO models is less than the first plurality of OAO models.

8. The server of claim 7, wherein the second plurality of OAO models is half of the first plurality of OAO models.

9. A method comprising:
   receiving, with an electronic processor executing an online application origination (OAO) service, form data from a third-party client server hosting a first online application;
   determining, with the electronic processor executing the OAO service and deep learning, a best OAO model from a plurality of OAO models with respect to the form data, each of the plurality of OAO models differentiates between a behavior of a normal user and a behavior of a nefarious actor during a submission process of a second online application using a first electronic device;

receiving, with the electronic processor executing the OAO service, information regarding a submission of the first online application using a second electronic device;

determining, with the electronic processor executing the OAO service, a fraud score of the submission of the first online application based on the best OAO model that is determined; and controlling, with the electronic processor executing the OAO service, the third-party client server to approve, hold, or deny the submission of the first online application based on the fraud score that is determined, wherein the plurality of OAO models are pre-existing models that are generated from second form data relative to respective online applications, the second form data being distinct from the form data, wherein the best OAO model is a model from the plurality of OAO models that has the lowest error in differentiating between the behavior of the normal user and the behavior of the nefarious actor during the submission of the first online application on the second electronic device relative to other models in the plurality of OAO models, wherein the third-party client server is administratively controlled by a first entity, and wherein the server is administratively controlled by a second entity that is separate and distinct from the first entity.

10. The method of claim 9, wherein determining the best OAO model from the plurality of OAO models further includes determining a reconstruction loss associated with each of the plurality of OAO models relative to the form data, and selecting an OAO model from the plurality of OAO models that has the lowest reconstruction loss as the best OAO model, the lowest reconstruction loss associated with the lowest error in differentiating between the behavior of the normal user and the behavior of the nefarious actor during the submission of the first online application on the second electronic device.

11. The method of claim 10, wherein determining the best OAO model from the plurality of OAO models further includes determining whether the reconstruction loss associated with the each of the plurality of OAO models relative to the form data exceeds a predetermined reconstruction loss threshold, generating a new OAO model based on the form data, and selecting the new OAO model as the best OAO model.

12. The method of claim 9, further comprising:

generating a first plurality of OAO models from a plurality of form types, and combining the first plurality of OAO models into a second plurality of OAO models that is different from the first plurality of OAO models, wherein the second plurality of OAO models is the plurality of OAO models.

13. The method of claim 12, wherein combining the first plurality of OAO models into the second plurality of OAO models further includes aligning a first portion of the first plurality of OAO models with one OAO model of the first plurality of OAO models, the one OAO model excluded from the first portion, clustering the first portion and the one OAO model into pairs based on weight features, and combining the pairs into respective combined models by averaging the weights, wherein the respective combined models is the second plurality of OAO models.

14. The method of claim 12, wherein combining the first plurality of OAO models into the second plurality of OAO models further includes performing maximum bipartite matching to combine the first plurality of OAO models into the second plurality of OAO models.

15. The method of claim 12, wherein the second plurality of OAO models is less than the first plurality of OAO models.

16. The method of claim 15, wherein the second plurality of OAO models is half of the first plurality of OAO models.

17. A fraud prevention system comprising:

a third-party client server hosting a first online application; and a fraud prevention server including an electronic processor and a memory, the memory including an online application origination (OAO) service and a plurality of OAO models, each of the plurality of OAO models differentiates between a behavior of a normal user and a behavior of a nefarious actor during a submission process of a second online application using a first electronic device, wherein, when executing the OAO service, the electronic processor is configured to receive form data from the third-party client server, determine, with deep learning, a best OAO model from the plurality of OAO models with respect to the form data, receive information regarding a submission of the first online application using a second electronic device, determine a fraud score of the submission of the first online application based on the best OAO model that is determined, and control the third-party client server to approve, hold, or deny the submission of the first online application based on the fraud score that is determined, wherein the plurality of OAO models are pre-existing models that are generated from second form data relative to respective online applications, the second form data being distinct from the form data, wherein the best OAO model is a model from the plurality of OAO models that has the lowest error in differentiating between the behavior of the normal user and the behavior of the nefarious actor during the submission of the first online application on the second electronic device relative to other models in the plurality of OAO models, wherein the third-party client server is administratively controlled by a first entity, and wherein the server is administratively controlled by a second entity that is separate and distinct from the first entity.

18. The fraud prevention system of claim 17, wherein, to determine the best OAO model from the plurality of OAO models, the electronic processor is configured to determine a reconstruction loss associated with each of the plurality of OAO models relative to the form data, and select an OAO model from the plurality of OAO models that has the lowest reconstruction loss as the best OAO model, the lowest reconstruction loss associated with the lowest error in differentiating between the behavior of the normal user and the behavior of the nefarious actor during the submission of the first online application on the second electronic device.

19. The fraud prevention system of claim 18, wherein, to determine the best OAO model from the plurality of OAO models, the electronic processor is further configured to
determine whether the reconstruction loss associated with the each of the plurality of OAO models relative to the form data exceeds a predetermined reconstruction loss threshold,
generate a new OAO model based on the form data, and
select the new OAO model as the best OAO model.

20. The fraud prevention system of claim 19, wherein the electronic processor is further configured to
generate a first plurality of OAO models from a plurality of form types, and
combine the first plurality of OAO models into a second plurality of OAO models that is different from the first plurality of OAO models, wherein the second plurality of OAO models is the plurality of OAO models.

* * * * *